United States Patent
Levsen

(10) Patent No.: US 6,315,654 B1
(45) Date of Patent: Nov. 13, 2001

(54) TRIPES CLEANING MACHINE

(75) Inventor: Clark A. Levsen, Shawnee, KS (US)

(73) Assignee: Hantover, Inc., Kansas City, MO (US)

(*) Notice: Subject to any disclaimer, the term of this patent is extended or adjusted under 35 U.S.C. 154(b) by 0 days.

(21) Appl. No.: 09/669,014

(22) Filed: Sep. 25, 2000

(51) Int. Cl.[7] ................................................ A22C 17/16
(52) U.S. Cl. ............................................ 452/123; 452/173
(58) Field of Search ..................................... 452/123, 173

(56) References Cited

U.S. PATENT DOCUMENTS

| | | | |
|---|---|---|---|
| 1,492,697 | * 5/1924 | Neuberth | 452/123 |
| 2,560,603 | * 7/1951 | Shelby | 452/123 |
| 3,393,413 | * 7/1968 | Walter | 452/123 |
| 3,509,593 | * 5/1970 | Moss | 452/123 |
| 3,611,477 | * 10/1971 | Walter et al. | 452/123 |
| 3,918,124 | * 11/1975 | Evers et al. | 452/123 |
| 4,293,980 | * 10/1981 | Ward | 452/123 |

FOREIGN PATENT DOCUMENTS

22639 * 10/1930 (NL) ..................................... 452/123

* cited by examiner

*Primary Examiner*—Willis Little
(74) *Attorney, Agent, or Firm*—Hovey, Williams, Timmons & Collins

(57) ABSTRACT

A tripes cleaning apparatus having a suspended, rotatable drum that presents an outer cylindrical surface on which the tripes are supported. The drum includes sets of flighting so as to facilitate arrangement of the tripes on each portion thereof in a single-layered helical orientation. A nozzle is associated with each set of flighting so that a low pressure cleaning fluid can be flushed through the tripes as the drum is rotated. Each nozzle is preferably activated to disperse cleaning fluid by bending the nozzle relative to its normally straight configuration, and a J-hook projects from the drum adjacent each nozzle to releasably hold the nozzle in the open, bent configuration and help retain the tripes against the drum. The apparatus further includes a spray bar operable to clean the outside of the tripes. The apparatus further provides loading and unloading troughs operable to support and collect the tripes, respectively, during cleaning and also a collecting trough operable to collect the debris and fluid discharged during cleaning. A tripes cleaning method is also disclosed as involving supporting the tripes on a suspended, rotatable surface and flushing the tripes as the surface rotates.

24 Claims, 4 Drawing Sheets

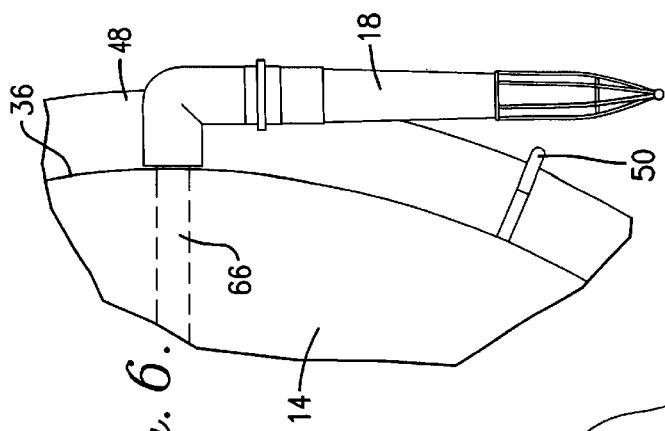
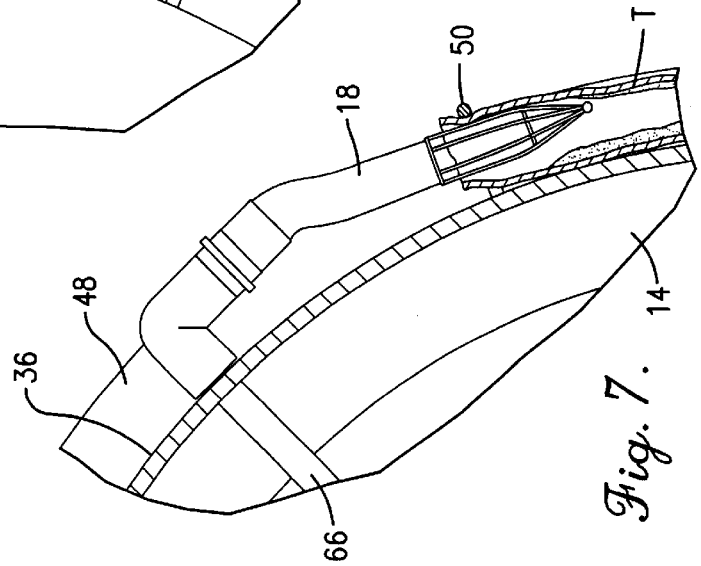
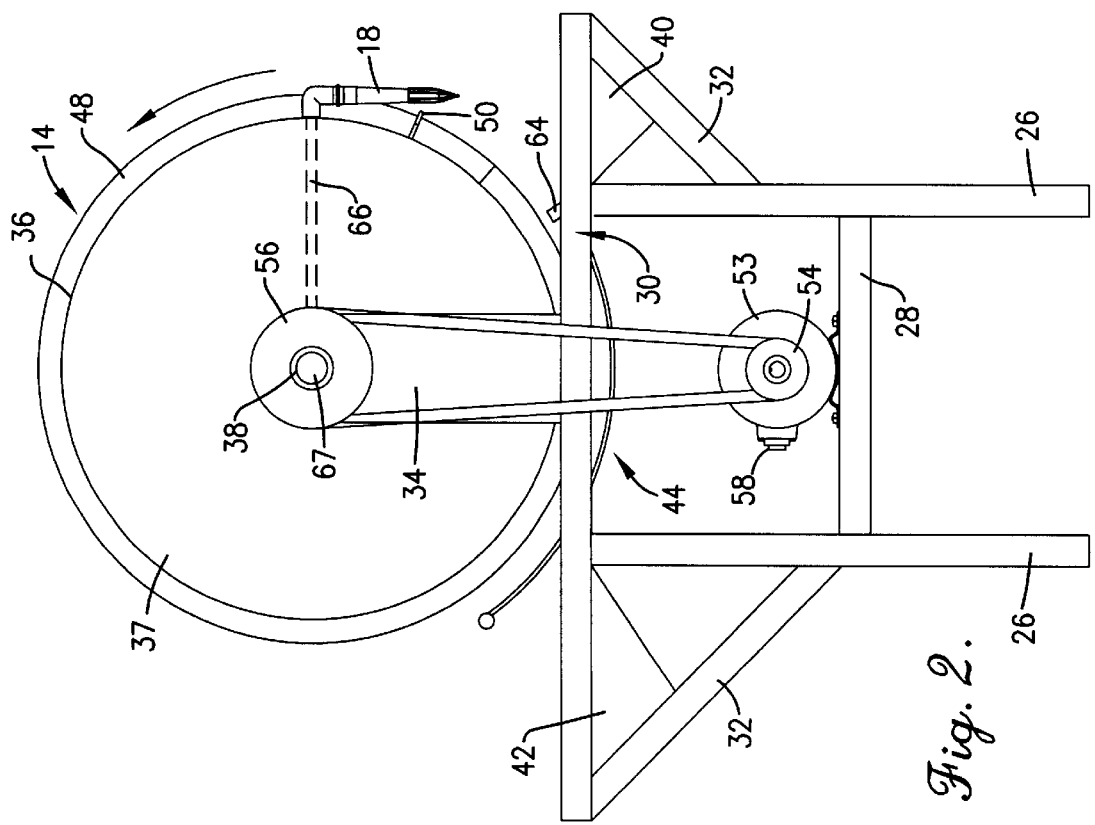

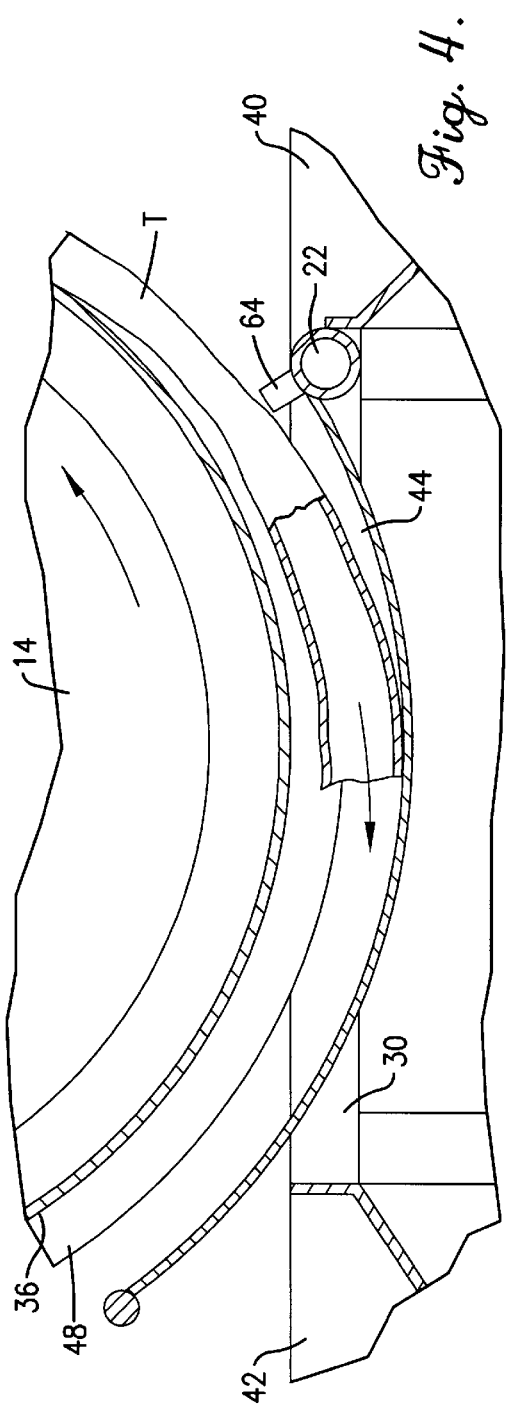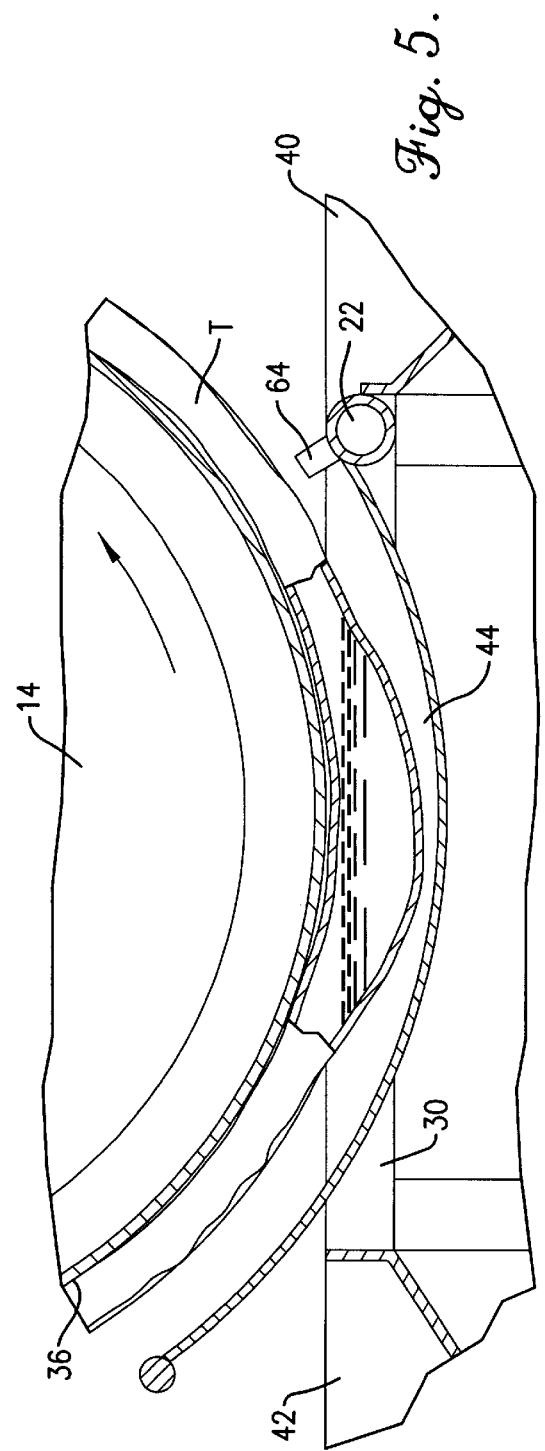

TRIPES CLEANING MACHINE

BACKGROUND OF THE INVENTION

1. Field of the Invention

The present invention relates generally to equipment used to clean intestines for preparation for consumption. More specifically, the present invention concerns a tripes cleaning system that involves mounting the tripes to a rotating surface and flushing the tripes with fluid while the surface revolves; thereby significantly reducing the time and effort involved in cleaning the tripes as compared to traditional tripes cleaning techniques.

2. Discussion of Prior Art

Those ordinarily skilled in the art will appreciate that cleaning tripes is traditionally accomplished by manually working the tripes on a corrugated table while flushing the inside of the tripes with a fluid. The fluid does not fill the tripes; therefore, requiring the tripes to be massaged to achieve satisfactory cleaning.

This common tripes cleaning technique, however, presents numerous problems. For example, massaging of the tripes often dislodges the micros membrane, or inside lining of the tripes. The micros membrane provides a flavor that is desired by tripes consumers and therefore the traditional way of cleaning tripes that does not leave the micros membrane in tact and inside the tripes is problematic. In addition, a tripe can range up to 70 or 80 feet in length and therefore the traditional way of cleaning tripes is relatively slow and labor intensive.

OBJECTS AND SUMMARY OF THE INVENTION

Responsive to these and other problems, an important object of the present invention is to provide a tripes cleaning system that is highly effective in cleaning tripes. Another important object of the present invention is to provide a tripes cleaning system that sufficiently cleans the tripes and leaves the micros membrane in tact and inside the tripes. Another important, yet related, object of the present invention is to eliminate the need for manually massaging the tripes. Yet another important object of the present invention is to provide a tripes cleaning system that is faster and less labor intensive than the traditional way of cleaning tripes.

In accordance with these and other objects evident from the following description of the preferred embodiment, the present invention concerns a tripes cleaning apparatus having a rotatable drum presenting a tripes supporting surface. The apparatus further includes a nozzle associated with the surface and operable to discharge fluid from a fluid source into the tripes as the drum is rotated. The present invention also concerns a tripes cleaning method including wrapping the tripes around a rotatable surface and flushing the tripes with a fluid while the surface is rotated.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 2 is a left end elevational view of the apparatus;

FIG. 4 is a fragmentary cross-sectional view of the apparatus showing the direction of drum rotation and fluid discharge from the distal end of the tripes;

FIG. 5 is a fragmentary cross-sectional view of the apparatus showing a fluid-filled tripes as it is revolved by the drum;

FIG. 6 is a fragmentary end elevational view of a portion of the apparatus, particularly showing the nozzle in its normal, straight, closed configuration; and FIG. 7 is a fragmentary cross-sectional view of a portion of the apparatus, particularly showing the nozzle being retained by the J-hook in a bent fluid discharging configuration.

DETAILED DESCRIPTION OF THE PREFERRED EMBODIMENT

Figure 1:
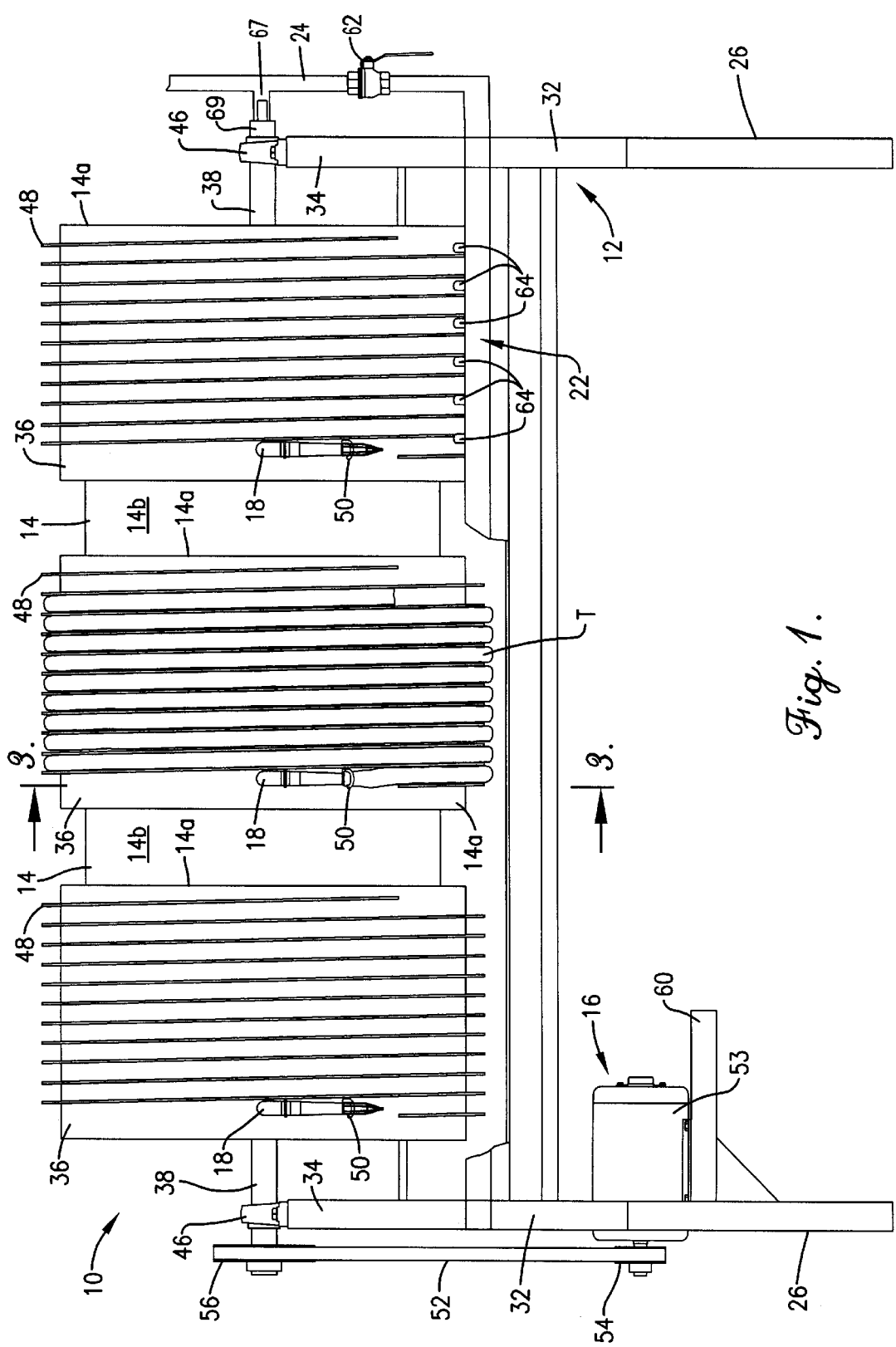
FIG. 1 is a side elevational view of a tripes cleaning apparatus constructed in accordance with the principles of the present invention, with components of the apparatus being removed to completely reveal a portion of the drum.

Referring now to FIG. 1, a tripes cleaning apparatus 10 constructed in accordance with the principles of the present invention is configured to provide relatively effortless, expedient and thorough cleaning of a tripes T. Although the apparatus may be variously configured, it is important that it be capable of supporting and revolving the tripes while flushing the tripes with cleaning fluid. With the foregoing caveat in mind, the illustrated apparatus 10 generally includes a frame 12 supporting a rotatable drum 14; a drive mechanism 16 drivingly connected to the drum 14; nozzles 18 associated with the drum 14 for discharging fluid into the tripes T as the drum 14 is rotated; a spray bar 22 for spraying fluid onto the outside of the tripes; a fluid supply line 24 for supplying fluid to the nozzles 18 and the spray bar 22; and three troughs 40, 42 and 44 (shown in FIG. 2) for facilitating loading and unloading the tripes and collecting discharged debris and fluid.

As depicted in FIGS. 1 and 2, the illustrated frame 12 preferably has four upright supporting legs 26, a pair of lower horizontal cross members 28 each extending between a corresponding pair of legs 26, and a pair of upper horizontal cross members 30 each positioned atop a corresponding pair of legs 26 and projecting laterally outward therefrom. An angled brace member 32 extends between each end of the upper cross members 30 and the adjacent leg 26 (perhaps best shown in FIG. 2). The frame 12 further includes two vertical end arms 34 each projecting from a respective one of the upper cross members 30. As will subsequently be indicated, the drum 14 is received and supported between the arms 34.

It will be appreciated that the illustrated frame 12 is configured for placement on a flat surface (e.g., a beef processing plant floor) so that the drum 14 is spaced above the surface at a convenient height (e.g., the drum 14 may be positioned so that its center rotational axis is approximately three to five feet above the surface). However, it is entirely within the ambit of the present invention to utilize any other alternative frame design that is capable of rotatably supporting the drum, such as a ceiling or wall mounted frame. The frame 12 can be constructed from any suitable material (e.g., stainless steel) sufficient to support the apparatus.

The rotatable drum 14 presents a tripes supporting surface 36 extending along the length of the drum. As shown in FIGS. 1 and 2, the illustrated drum 14 is generally cylindrical in shape and presents a center, longitudinal rotational axis. In the illustrated embodiment, the tripes supporting surface 36 is divided into three sections, with the surface sections each being defined by a collar 14a. The collars 14a are spaced apart along the length of the drum 14, with a radially smaller core 14b being fixed between each pair of collars 14a. Each end of the drum 14 is preferably covered by an end plate 37 (e.g., see FIG. 2), although the end of the drum can alternatively remain open to facilitate maintenance and service. The drum 14 includes a pair of oppositely projecting stub shafts 38 each of which extends from a respective one of the end plates 37. A pair of bearing assemblies 46 provided on the vertical arms 34 rotatably support the shafts 38, respectively, and thereby support the drum 14 on the frame 12 for relative rotational movement. It will be appreciated that the shafts 38 define and are positioned along the longitudinal rotational axis of the drum 14.

As noted, the support surface 36 is preferably cylindrical in shape; however, various alternative surface shapes and configurations, as well alternative drum shapes and configurations, are entirely within the ambit of the present invention. It is only critical that the apparatus have a revolving surface on which the tripes may be supported. Although it is most preferred for the tripes supporting surface 36 to be smooth and corner-less (e.g., circular or elliptical in cross-section) to reduce bending, kinking, or rupturing of the tripes, the principles of the present invention are equally applicable to a surface that has corrugations or corners. Further, the drum may alternatively be configured to present a constant diametrical dimension along the entire length of the drum. In addition, the rotational axis need not be coaxial with the center, longitudinal axis of the drum 14 (e.g., the rotational axis could be eccentric relative to the drum axis).

As perhaps best shown in FIG. 1, the rotatable drum 14 preferably includes multiple sets of flighting 48, which allows for multiple tripes to be cleaned in the apparatus 10 simultaneously. In addition, the tension on the tripes as it is being loaded onto the drum in some instances may cause it to rupture or tear that in turn allows the fluid to leak out of the tripes. In these situations, the tripes can be cut at the rupture or tear and reloaded onto the next available set of flighting. Any number of sets of flighting can be implemented. In addition, the illustrated sets of flighting are spaced apart along the length of the drum 14; however, it is entirely within the ambit of the present invention to arrange multiple sets of flighting immediately one after the other along the length of the drum so that there is no space between the sets. The principles of the present invention are equally applicable to sets of flighting that are wrapped together around the drum so that each convolution or flight of a set is immediately adjacent a flight of another set.

With particular respect to the illustrated embodiment, there are three sets of flighting 48 each projecting from a respective one of the collars 14a. That is to say, each set of flighting 48 is associated with a respective section of the tripes supporting surface 36. Preferably, each set of flighting is formed of a strip of stainless steel wrapped around and attached to the respective collar 14a by suitable means (e.g., welding, fasteners, etc), although various other materials and means for associating the flighting with the respective collar may be used. The flighting 48 operates to helically arrange the tripes in a single layer arrangement along the surface 36 as the drum 14 is rotated. Those skilled in the art will appreciate that tripes are naturally attached to and supported by a fat layer and along the entire length of the tripes a portion of its circumference is covered by fatty tissue remnants of the fat layer. Those skilled in the art will further appreciate that this fatty tissue is not as stretchable as intestinal tissue. This quality will naturally orient the fatty tissue side of the tripes against the surface 36 and in combination with the flighting 48 eliminates bends and kinks in the tripes. To increase the grip of the tripes on the surface 36 various materials could be adhered to the surface, for example a coarsely configured silicon carbide could be adhered to the surface using a resin.

The diameter of the drum 14 is preferably approximately thirty two (32) inches. The pitch of the flighting 48 is preferably approximately one and one-half (1.5) inches. With these preferable dimensions, rotating the drum 14 at twenty (20) revolutions per minute should completely load, or wrap a tripes, onto the drum in approximately nine revolutions, or approximately thirty (30) seconds. Any workable dimensions, pitch, flighting shape and revolutionary speed could be implemented.

Because the illustrated drum 14 presents multiple locations for supporting tripes, the apparatus 10 includes multiple nozzles 18. In the preferred embodiment, there are three nozzles 18 corresponding with the three sets of flighting 48, however, as discussed above with regard to the sets of flighting 48, any number of nozzles can be implemented. As perhaps best shown in FIG. 3, each nozzle 18 is connected to the supply line 24 by a separate radial tube 66 projecting from a common central distribution line 67. The distribution line 67 extends at least substantially the full length of the drum 14 and supplies fluid to each of the radial tubes 66. Furthermore, the distribution line 67 projects from an end of the drum and through the corresponding stub shaft 38 to connect to the supply line 24 by a suitable swivel connection 69. It is noted that the fluid supply line 24 projects from or is connected a source of tripes cleansing fluid (e.g., a pump connected to a fluid solution reservoir, water tap, etc). Accordingly, the nozzles 18 operate to discharge fluid into the tripes as the drum is rotated. It is further noted that the hollow configuration of the drum 14 is particularly desirable in light of the above-mentioned plumbing components preferably being located therein.

In the preferred embodiment, each the nozzles 18 include a valving mechanism for controlling fluid flow from the nozzle. However, the principles of the present invention are equally applicable to nozzles having no valving mechanism (e.g., a continuously open fluid discharge spigot) or a system providing a flow control valve for each nozzle at a point spaced from the nozzle. With respect to the preferred embodiment, each nozzle 18 has a bendable portion for controlling the valving mechanism (see FIGS. 6 and 7). Each illustrated nozzle 18 operates to discharge fluid when in a bent configuration (see FIG. 7) and to prevent fluid discharge when in a straight configuration (see FIG. 6). This allows the supply of fluid to remain uninterrupted to all nozzles, yet only discharge fluid through the nozzle or nozzles when in a bent configuration, such as when a tripes is attached. One suitable nozzle providing the preferred valving mechanism and operation is available as a "WATER SAVER NOZZLE" from Lonn Manufacturing Company of Indianapolis, Ind.

The illustrated drum 14 further includes a plurality of J-hooks 50. In the preferred embodiment, each J-hook 50 projects from the tripes support surface 36 adjacent one of the nozzles 18 (see FIG. 1), and there are consequently three J-hooks provided on the illustrated apparatus 10. Similar to the drum 14 and sets of flighting 48, the hooks 50 are preferably formed of stainless steel.

The illustrated hooks 50 perform numerous functions. For example, each hook 50 is dimensioned and configured to capture and retain the associated nozzle 18 in the bent configuration (see FIG. 7). When it is desired to maintain fluid flow from the nozzle 18 (e.g., when a tripes has been connected to the nozzle), the nozzle 18 is bent and placed under the hook 50 so as to be retained thereby in the bent, valve-open configuration. As shown in FIG. 6, the nozzle 18 is normally in the straight configuration and spaced from the hook 50. The hook 50 also facilitates retention of the tripes on the nozzle. If desired, the tip of the nozzle 18 may be provided with a barb (not shown) to further facilitate retention of the tripes thereon. Yet further, the support surface 36 may also be configured to assist in retaining the tripes on the nozzle 18. For example, the surface 36 may be roughened or texturized adjacent the nozzles 18 to enhance the frictional interengagement between the tripes and surface and thereby restrict longitudinal shifting of the tripes relative to the nozzle 18. As noted above, one suitable arrangement involves adhering silicon carbide to the surface 36 (e.g., to the surface around the first convolution of flighting). Each J-hook 50 further operates in conjunction with the surface 36 to form a tripes receiving passageway in which the tripes are removably received and captured. In other words, the hooks 50 help to retain the tripes against the surface 36 as the tripes is flushed. In this regard, the drum 14 may be provided with numerous hooks spaced along the flights of each set of flighting, if desired.

Although the J-hooks 50 are preferably rigid, they may alternative have some flexibility, particularly at the base (i.e., adjacent the surface 36), to facilitate placement of the nozzle 18 and/or tripes therein. The functions performed by the J-hooks 50 in the illustrated embodiment could also be performed by various other components appropriately suited, including hooks of differing shapes, as well as a combination of components, for example a rigid element to provide the retention of the nozzles 18 and a separate clamping component to receive and retain the tripes. It is also possible for the hooks 50 to alternatively comprise a closed loop cooperating with the tripes supporting surface to define the passageway, such that the tripes must be inserted endwise through the passageway. As discussed above with respect to the sets of flighting 48 and the nozzles 18, any number of J-hooks 50 can be implemented.

The drive mechanism 16 in the preferred embodiment is an electric motor 53. A drive sheave 54 fixed to the output shaft of the motor 53 is entrained by a belt 52 that extends upwardly to wrap around a driven sheave 56 fixed to the shaft 38. The illustrated embodiment uses a single speed electric motor controlled by switch 58. The wheels 54 and 56 are configured to step up the motor speed to twenty (20) revolutions per minute of drum speed. In the preferred embodiment, the motor 53 is mounted to a gusseted motor stand 60 projecting from the cross-member 28. Other embodiments could implement any suitable drive mechanism and power source for rotating the drum. In addition, the various mechanisms implemented could be positioned in any suitable location. For example, the drive mechanism may alternatively comprise a manual hand crank. Further, the power source may alternatively comprise a variable speed motor, a gas-powered motor, a centralized power source of a processing plant, etc.

In the illustrated embodiment, the spray bar 22 operates to clean the exterior of the tripes by spraying fluid onto the outside of the tripes while the drum 14 is rotated. Similar to the nozzles 18, fluid is supplied to the spray bar 22 from the fluid source by the supply line 24. A valve 62 interposed along the supply line 24 downstream from the distribution line 67 but upstream from the spray bar 22 is provided for controlling fluid flow to the bar 22. Accordingly, the valve 62 may be closed to prevent fluid flow to the spray bar 22, but the valve 62 does not affect fluid flow to the nozzles 18. This allows a person operating the tripes cleaning apparatus 10 to prevent the supply of fluid to the spray bar 22 to avoid getting sprayed while working near the apparatus 10 (for example, to cut a tripes at a nick and reattach the cut portion of the tripes onto a next available nozzle), yet still allow for the tripes rotating on the apparatus 10 to continue to be supplied with fluid through the nozzles 18. In the illustrated embodiment, the spray bar 22 includes jets 64 spaced along the length of the bar (e.g., see FIGS. 1 and 3). The jets 64 operate to jet fluid onto the outside of the tripes. In essence, the exterior of the tripes is cleaned automatically as it is supported on the drum 14. It will be appreciated, however, that other suitable method of cleaning the outside of the tripes are entirely within the ambit of the present invention. For example, the apparatus may alternatively be provided with multiple spray bars, an alternatively configured bar(s) (e.g., a tubular bar having spaced apart openings), a hand-held spray wand, a moveable sprayer, etc.

As shown in FIG. 2, the loading trough 40 is attached to the frame 12 to be slightly under and spaced generally laterally from the drum 14. The loading trough 40 extends along the length of the drum 14. The trough 40 is provided so that the tripes are conveniently supported adjacent the drum 14 while being loaded thereon. Once the tripes have been placed in the trough 40, one end of the tripes is secured on the nozzle 18 (see FIG. 3). This preferably involves placing the nozzle 18 and attached end of the tripes into the J-hook 50, which not only begins to flush the tripes but also facilitates retention of the tripes on the nozzle. The tripes is pulled out of the trough 40 and onto the drum as the drum 14 rotates. As noted above, the flighting 48 helps arrange the tripes in a single helical layer around the drum 14. The preferred embodiment has the loading trough 40 positioned on one side of the drum 14 so that the drum 14 rotates away from the loading trough 40 thereby pulling the tripes onto and over the drum 14. The loading trough 40 preferably has a triangular cross-sectional shape and is formed of stainless steel, although other materials and trough configurations are contemplated by the present invention.

On the side of the drum 14 opposite the loading trough 40 is the unloading trough 42. The unloading trough 42 is similarly supported by the frame 12 and is also preferably triangular in cross-sectional shape and formed of stainless steel. The unloading trough 42 similarly extends along the length of the drum 14 but is intended to support the tripes as it is being unloaded off the drum (i.e., as the tripes unwraps from the drum). The tripes are unloaded off of the drum 14 by removing the end of the tripes from the J-hook 50 and the nozzle 18 and directing the end of the tripes into the unloading trough 42 as the drum 14 rotates. The remaining portion of the tripes should naturally fall into the unloading trough 42 as the drum rotates. It is noted that either or both troughs 40 and 42 may be provided with perforations, sloped to one end or the other, or otherwise configured to drain fluid therefrom.

Figure 3:
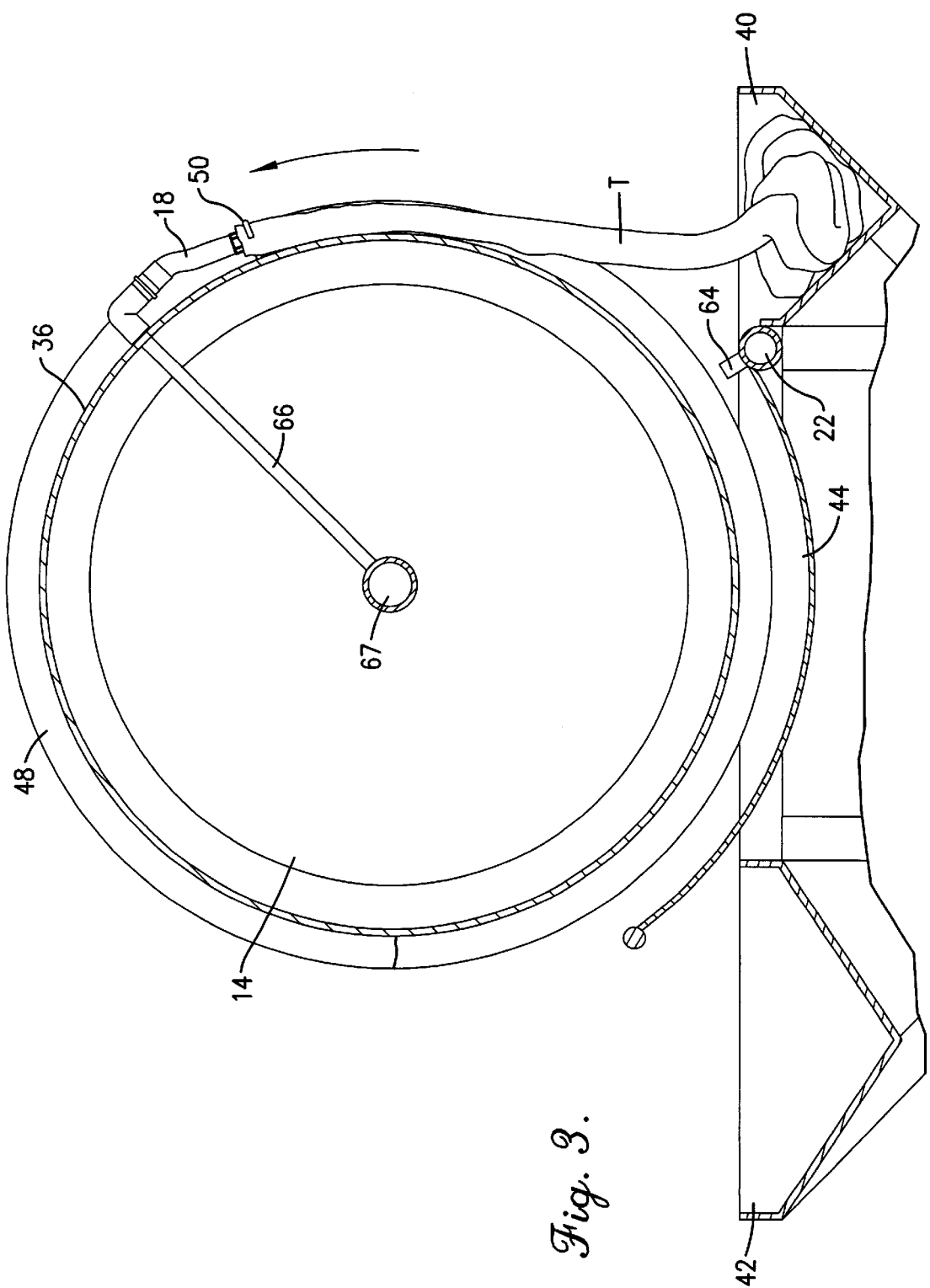
FIG. 3 is a cross-sectional view of the apparatus taken generally along line 3—3 in FIG. 1.

In the preferred embodiment, the collecting trough 44 is positioned between the loading trough 40 and the unloading trough 42. The collecting trough 44 is attached to the frame 12 at both ends and connected to the spray bar 22. The collecting trough 44 extends along the length of the drum 14 and is intended to collect the debris and fluid discharged from the tripes. It is noted that the collecting trough 44 preferably has an arcuate cross-sectional shape that is concentric with the drum 14, although other suitable trough configurations, shapes and arrangement are entirely within the ambit of the present invention. Furthermore, the collecting trough 44 is preferably formed of stainless steel. As shown in FIGS. 3 and 4, the collecting trough 44 projects from the spray bar 22 and therefore does not cover the loading trough 40; however, the collecting tough 44 extends partially over the unloading trough 42 to facilitate the collection of all discharged debris and fluid. That is to say, the collecting trough 44 extends further up the unloading trough side of the drum 14 than the loading trough side of the drum 14. Such a relationship is particularly preferred because debris and fluid are discharged in the direction of the unloading trough 42 as the drum 14 rotates. The edge of the collecting trough 44 located over the unloading trough 42 is rounded to lessen the likelihood of the tripes catching on the trough 44 as it unloads into the trough 42. It is believed that the trough 44 may also help hold the tripes on the drum 14, particularly the unconnected distal end thereof, as the tripes revolves to the underside of the drum 14 and is filled with cleaning fluid (e.g., see FIG. 4). Although not illustrated, the collecting trough communicates with a suitable drain. In fact, the apparatus 10 may alternatively be designed so that fluid and debris from the tripes falls directly to the floor (not shown) on which the frame rests, with the floor preferably having a suitable drain or collection basin associated therewith.

The tripes to be cleaned on the tripes cleaning apparatus 10 are initially loaded onto the drum 14 by placing the tripes in the loading trough 40 and fixing one end of the tripes to the nozzle 18. The fixed end of the tripes is positioned into the J-hook 50 so that the nozzle 18 is retained in a bent configuration as shown in FIG. 7. The drum 14 is either then rotated or has been rotating as the tripes is attached thereto. The tripes is wrapped around the drum 14 as shown in FIG. 3. The flighting 48 facilitates arrangement of the tripes along the surface 36 in a single layer helical configuration. As the drum 14 rotates, the nozzle 18 discharges fluid into the tripes. The rotation of the drum 14, in combination with gravity, allows for a relatively low volume of low pressure fluid to provide a highly effective cleaning of the tripes while leaving the micros membrane in tact and inside the tripes. As shown in FIG. 5, a relatively low fluid flow is preferably discharged from the nozzle and falls by gravity into the lower portion of the tripes (i.e., to the portion of the tripes near the bottom of drum 14). The small volume of fluid remains at the bottom of the drum 14 as a result of gravity and, because the tripes is wrapped around the drum 14, the fluid naturally flows through the tripes toward the unconnected, free distal end of the tripes. It is believed that each time the nozzle passes over top dead center (i.e., the twelve o'clock position when viewing FIG. 3) a quantity of fluid is caught within the first round (the first convolution of the tripes around the drum) of the tripes and this quantity of fluid flushes through the remaining rounds of the tripes as the drum 14 rotates. Again, the quantity of fluid remains at the bottom of the drum 14 as the fluid moves toward the distal end of the tripes. The quantity of fluid is preferably of sufficient volume to entirely immerse the inner circumference of the tripes along at least a noticeable segment of each round, without filling each round (e.g., see FIG. 5). For example, the supply line 24 and/or nozzles 18 may be configured to discharge approximately one (1) pint of fluid per drum revolution. However, the principles of the present invention are equally applicable to filling the tripes with fluid and then disconnecting the tripes from the nozzle and permitting it to revolve on the drum until all of the fluid has been drained. In any case, as shown in FIG. 4, the fluid and debris exits the distal end of the tripes as the drum 14 rotates. It is believed that the proximal end of the tripes can be disconnected from the nozzles 18 as soon as, or shortly after, the distal end of the tripes has wrapped onto the drum 14; however, it is entirely within the ambit of the present invention to permit the tripes to continue to revolve on the drum for several revolutions after the distal end is picked up off the loading trough 40. When it is desired to unwrap the tripes from the drum 14, the fixed end of the tripes and the nozzle 18 are removed from the J-hook 50 and the nozzle 18 is returned to the straight configuration to thereby terminate fluid flow therefrom. The fixed end of the tripes is then detached from the nozzle 18 and directed into the unloading trough 42 so that the tripes unwraps into the unloading trough 42 as the drum 14 is rotated. It is possible to implement a movable shield to shield users from the distal end of the tripes in motion. There is preferably at least one user on each side of the apparatus, so that at least one worker loads the tripes onto the drum 14 and at least one worker unloads tripes from the drum 14.

The preferred form of the invention described above is to be used as illustration only, and should not be utilized in a limiting sense in interpreting the scope of the present invention. Obvious modifications to the exemplary embodiment, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A tripes cleaning apparatus comprising:
   a rotatable drum presenting a tripes supporting surface; and
   a nozzle associated with said surface and operable to discharge fluid from a fluid source into the tripes as the drum is rotated.

2. An apparatus as claimed in claim 1,
   said drum is cylindrical.

3. An apparatus as claimed in claim 2,
   said drum having a diameter of about 32 inches.

4. An apparatus as claimed in claim 1,
   said drum including a set of flighting attached to said surface, said flighting being operable to helically arrange the tripes along said surface.

5. An apparatus as claimed in claim 4,
   said flighting having a pitch of about 1.5 inches.

6. An apparatus as claimed in claim 4,
   said drum including an additional set of flighting attached to said surface and offset from said first-mentioned set of flighting, said additional set of flighting being operable to helically arrange the tripes along said surface; and
   an additional nozzle associated with said surface, said additional nozzle being operable to discharge fluid from a fluid source into the tripes arranged by said additional set of flighting as said drum is rotated.

7. An apparatus as claimed in claim 1,
   said nozzle having at least a portion thereof that is bendable and thereby operable to control fluid discharge from the nozzle.

8. An apparatus as claimed in claim 7, said nozzle being operable to prevent fluid discharge when said at least a portion thereof is in a straight configuration and operable to permit fluid discharge when said at least a portion thereof is in a bent configuration.

9. An apparatus as claimed in claim 8, said drum including a rigid element fixed relative to the surface and operable to releasably retain the nozzle in the bent configuration.

10. An apparatus as claimed in claim 1, said drum including a hook projecting from the surface and cooperating therewith to define a tripes receiving passageway in which the tripes may be removably received.

11. An apparatus as claimed in claim 10, said hook being J-shaped.

12. An apparatus as claimed in claim 1; and a drive mechanism, with said drum being drivingly connected to the mechanism so as to be rotated thereby.

13. An apparatus as claimed in claim 1, said drum presenting a rotational axis;

a frame supporting the drum for rotation about the axis; and loading and unloading troughs attached to the frame and operable to support the tripes.

14. An apparatus as claimed in claim 13, said drum being cylindrical, and the rotational axis extending along the length of the drum, said troughs extending along the length of the drum and projecting in opposite directions relative to the rotational axis.

15. An apparatus as claimed in claim 13; and a collecting trough positioned between the loading and unloading troughs, said collecting trough operable to collect the debris and fluid discharged.

16. An apparatus as claimed in claim 1; and a spray bar operable to spray fluid from the fluid source onto the outside of the tripes.

17. A tripes cleaning method comprising the steps of:

(a) wrapping the tripes around a rotatable surface; and (b) flushing the tripes with a fluid while said surface is rotated.

18. A method as claimed in claim 17; and (c) spraying the outside of the tripes as the tripes is flushed.

19. A method as claimed in claim 17, step (a) including the steps of placing the tripes onto a loading trough and fixing an end of the tripes relative to the surface such that the tripes is rolled onto the surface as the surface is rotated.

20. A method as claimed in claim 17; and (c) unwrapping the tripes from the surface.

21. A method as claimed in claim 20, step (c) being performed after step (a) has been completed.

22. A method as claimed in claim 20, step (c) including the steps of detaching an end of the tripes from the surface and placing the detached end of the tripes in an unloading trough so that the tripes unwraps into the unloading trough.

23. A method as claimed in claim 17, step (a) including the step of positioning the tripes in a set of flighting projecting from the surface so that the tripes is wrapped onto the surface in a helical arrangement.

24. A method as claimed in claim 17, step (b) including the step of connecting an end of the tripes to a fluid discharge nozzle.

* * * * *